United States Patent
Eldredge

(10) Patent No.: US 10,265,774 B1
(45) Date of Patent: Apr. 23, 2019

(54) ADJUSTABLE CASE PREPARATION TOOL

(71) Applicant: Eric P. Eldredge, Fallon, NV (US)

(72) Inventor: Eric P. Eldredge, Fallon, NV (US)

( * ) Notice: Subject to any disclaimer, the term of this patent is extended or adjusted under 35 U.S.C. 154(b) by 0 days.

(21) Appl. No.: 16/114,016

(22) Filed: Aug. 27, 2018

(51) Int. Cl.
*B21D 51/54* (2006.01)
*B23B 5/16* (2006.01)
*F42B 33/10* (2006.01)

(52) U.S. Cl.
CPC .............. *B23B 5/168* (2013.01); *F42B 33/10* (2013.01); *B23B 2215/10* (2013.01)

(58) Field of Classification Search
CPC ...... B23B 5/168; B23B 2215/10; F42B 33/10
USPC .................................................. 86/19.5, 19.7
See application file for complete search history.

(56) References Cited

U.S. PATENT DOCUMENTS

| | | | |
|---|---|---|---|
| 2,406,170 A | | 8/1946 | Smiley |
| 3,199,168 A | * | 8/1965 | Rhine ..................... B23B 5/168 86/19.7 |
| 3,555,641 A | * | 1/1971 | Lee .......................... F42B 33/06 102/464 |
| 4,405,269 A | | 9/1983 | Hertzler |
| 4,468,829 A | | 9/1984 | Cristensen |
| 4,653,157 A | | 3/1987 | Alexander |
| 4,742,606 A | | 5/1988 | Burby |
| 4,813,827 A | | 3/1989 | Dugger |
| 4,860,453 A | | 8/1989 | Carroll |
| 5,050,475 A | | 9/1991 | Kolmer |
| 5,064,320 A | * | 11/1991 | Markle .................... B23B 5/167 408/202 |
| 5,301,436 A | | 4/1994 | Johnston |
| 5,635,661 A | * | 6/1997 | Tuftee ..................... F42B 33/10 86/24 |
| 5,649,465 A | * | 7/1997 | Beebe ..................... F42B 33/10 86/1.1 |
| 5,718,423 A | | 2/1998 | Blodgett |
| 6,484,616 B1 | | 11/2002 | Giraud |
| 8,408,112 B2 | | 4/2013 | Keska |
| 8,827,607 B1 | | 9/2014 | Goodman |
| 9,146,087 B2 | | 9/2015 | Cottrell |
| 9,970,741 B1 | | 5/2018 | Eldredge |

* cited by examiner

*Primary Examiner* — Gabriel J. Klein

(57) ABSTRACT

The adjustable case preparation tool polymer body has a tungsten carbide blade or blades, an adjustment screw, and a lock nut to secure the adjustment. The adjustment screw bears on a pin, which slides in a tube, which is held by friction fit in the molded or 3D printed body. The screw attaches the tool to a handle, prep center, or rotor. Colors identify calibers, and a tool fits every cartridge in that caliber by interchanging lengths of pins and tubes. The tool can be used with interchangeable spindle sleeves in increments of diameter for a precise fit. The flash hole deburring tool will not enlarge or chamfer a flash hole, and the neck turner will not mar a case mouth. The embodiments work on a case held in a case holder, and cutting stops when the pin through the flash hole touches the solid face of the case holder.

11 Claims, 4 Drawing Sheets

1-1

ADJUSTABLE CASE PREPARATION TOOL

BACKGROUND OF THE INVENTION

This disclosure relates generally to the manufacture of ammunition, and specifically to reconditioning cartridge cases for reloading with an adjustable tool design that allows embodiments which, when used as a set, prepare cases for reloading.

Brass cartridge cases elongated with repeated firing and resizing. When a case exceeded the overall length specified for the cartridge, excess length was removed by trimming the open end, or mouth, on the neck of the case. For decades attempts were made to improve and simplify case preparation for reloading, also called handloading. Case trimming devices generally were a cutter on a hand cranked shaft, mounted on one end of a frame, which held the case at the other end. An early version was taught by Smiley in U.S. Pat. No. 2,406,170 issued 20 Aug. 1946, and a later motorized version was taught by Blodgett, et al., U.S. Pat. No. 5,718,423 issued 17 Feb. 1998. Improvements by others included various case holders, including holding the case in a collet, a clamp, or in a die cradled on the frame. A different design, for a hand held tool, was taught by Lee, U.S. Pat. No. 3,555,641 issued 19 Jan. 1971, and used a fixed length guide, specific to a cartridge, inserted into the case with a narrow end extending through the flash hole to axially position the cutter and control the depth of cut by abutting a case holder. Other designs used motorized cutters on a drill press, or on a reloading press with, or in place of, a die. More recently, motorized trimmers were developed that indexed case length from a shoulder datum, as did the earlier hand cranked Jordan trimmer. Some examples were those taught by Gracey, U.S. Pat. No. 4,686,751 issued 18 Aug. 1987, Giraud, U.S. Pat. No. 6,484,616 issued 26 Nov. 2002, and Goodman, U.S. Pat. No. 8,827,607 issued 9 Sep. 2014.

After a case was trimmed to length, the steps of chamfering and deburring the case mouth were performed, mostly by hand held tools, which could be followed or preceded by cutting a burr from the flash hole, and uniforming neck thickness, also by hand held or hand cranked tools. Recently, case preparation machines, which were essentially motorized versions of the hand cranked device of Kolmer, U.S. Pat. No. 5,050,475 issued 29 Aug. 1989, were marketed. An example was taught by Cottrell, et al., U.S. Pat. No. 9,146,087 issued 29 Sep. 2015. These were known in the trade as case "prep centers". On a prep center, a motor turned gears to turn multiple tools, and each case was manually applied to each twirling tool in sequence. Gripping each case, particularly small cases, against the torque of each cutting tool was fatiguing, especially for arthritic hands, when large batches of cases were prepared.

Because the cases were applied to the tools manually, the angles and depths of cuts were inconsistent, defeating one purpose of case preparation, which was to make all cases in a batch as uniform as possible. Case mouth chamfering and deburring tools, whether hand held or powered, suffered from the lack of a means to control the depth of cut. This often resulted in cuts of varying depth and concentricity, or a sharp edge on the case mouth. A tool taught by Carroll, U.S. Pat. No. 4,860,453 issued 29 Aug. 1989 had a guide to control concentricity, and some were adjustable in length for different cartridges, with adjustment tenuously held by a setscrew, but they were mostly hand operated tools. What was needed was an adjustable tool, which could be used by hand or on a case preparation machine, to chamfer and deburr case mouths uniformly to an adjustable depth.

Some cartridge case manufacturers drilled the primer flash hole. Most commonly flash holes were punched. Drilling or punching the flash hole could leave a burr inside the case which needed to be removed for uniform ignition. Various flash hole uniforming tools were developed, mostly hand held, and mostly based on machinists' center/countersink or similar drill bits. These generally enlarged flash holes to a uniform size and chamfered them. What was needed was an adjustable tool, which could be used by hand or on a case preparation machine, to remove a burr from the web on the inside of the case while leaving the flash hole a cylindrical orifice without chamfering or enlarging it.

Case neck turning tools were developed to remove material from the thicker areas on the neck of the case to align the bullet more concentrically with the bore. Most case neck turners had a cylindrical mandrel protruding from a circular ledge. A case neck was slid onto the mandrel, and the ledge was adjusted to serve as a stop for the case neck relative to the blade. The length of the cut was controlled by the case mouth being forced up to and bearing against the ledge while being turned by hand or a motor. This could mar the soft brass case mouth to varying degrees depending on the amount of force applied in turning the case against the hardened steel ledge. What was needed was an adjustable tool, which could be used by hand or on a case preparation machine, to turn case necks without marring the case mouth. Despite decades of attempts to improve case preparation crowding the field, cartridge case preparation remained the most onerous task in reloading.

BRIEF SUMMARY OF THE INVENTION

The adjustable case preparation tool polymer body has an adjustment screw bearing on a pin in a tube, with a blade or blades on the body. The adjustable case preparation tool body is made for a specific bullet case neck diameter, hereinafter referred to as caliber. The tool may be mounted in a handle and turned by hand, or turned by a prep center to use on a case held in a case holder. The tool may be chucked in a drill and applied to a case held firmly against a hard surface, whereon the pin is the stop for the cutting action of the blade. Preferably, the tool is held stationary and applied to a case in a case holder being turned by a motor, as in the Cartridge Case Preparation Rotor Device of U.S. Pat. No. 9,970,741 issued 15 May 2018 to Eldredge, the applicant herein.

The tool may be manufactured by 3D printing, casting, or molding in any caliber. The tool length is easily modified by interchanging pin and tube components for each length of cartridge in a given caliber. Finer increments of adjustment are provided by the screw, which is secured with a lock nut. This design allows embodiments that deburr a flash hole without enlarging or chamfering it, and turn case necks without marring the case mouth. The adjustment screw size 8-32 also fastens the embodiments onto many existing prep centers and handles. Accordingly, in a method of using the adjustable case preparation tool embodiments as a set of tools to perform the steps to prepare a cartridge case for reloading, they necessarily interact cooperatively to produce uniform results on each case in a batch of cases.

The foregoing and other objectives, features, and advantages of the adjustable case preparation tool will be more readily understood upon consideration of the following detailed description of the various embodiments, taken in conjunction with the drawing.

DETAILED DESCRIPTION OF THE INVENTION

Figure 1:
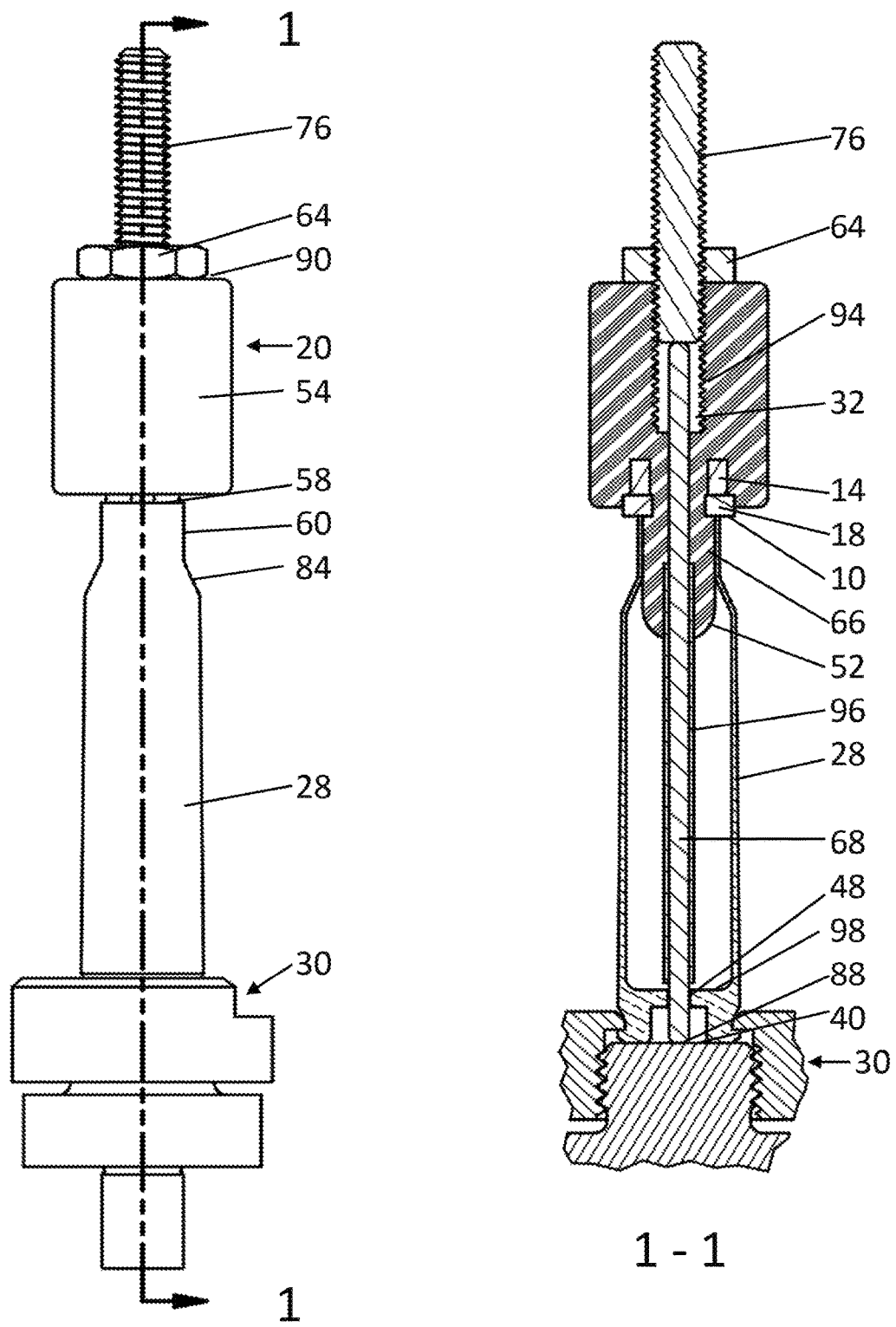
FIG. 1 is a side view of a case trimmer embodiment in a prior art cartridge case held in a prior art case holder, with 1-1 a lengthwise section thereof.

As it will be apparent to those skilled in the art that various changes could be made in the disclosed embodiments, constructions, and methods and remain within the scope and spirit of an adjustable case preparation tool as claimed, the explanation in the detailed description and matter shown in the figures of the drawing shall be construed to include all conceivable differences and equivalents, and therefore shall be interpreted as example and illustration, and not in a limiting sense.

One mode of making the adjustable cartridge case preparation tool begins with making the elongate body 20, FIG. 1 and section 1-1, which may be 3D printed or injection molded, poured, or cast, of plastic, polymer, metal, epoxy or other resin, with or without reinforcement, or machined metal or polymer, or other suitable material, composite, or other suitable combination of materials or methods. Body 20 caliber identification may be printed, stamped, engraved, or otherwise marked on it. Different colors, or contrasting colors, or visual patterns, may be used to identify the caliber of embodiments of the tool. Body 20 has a first end, comprising a ball 52 and a cylindrical spindle 66. Ball 52 aids insertion of the tool into a case 28, and may be a truncated tangent or secant ogive, frustum, or other tapered shape. From the center axis of ball 52 a tube 96 extends for a length depending on the length of case 28 being prepared, near but not touching the web 98 of case 28 when inserted therein. Tube 96 fits into an internal cavity 32 on the central longitudinal axis of body 20. From tube 96 a first end of a first elongate component, the pin 68, protrudes for an adjustable length to pass through the flash hole 48 of case 28, to serve as a stop 88 for the cutting action of the tool, against a solid face 40 of a prior art case holder 30 holding a prior art case 28. The solid face 40 of case holder 30 may be convex, recessed, flat, indented, concave, or other suitable shape.

Pin 68 fits slidably within, and is supported by, tube 96. Any other means of adjusting the length of stop 88, beyond flash hole 48, may be used, such as a narrow end on any rod, tube, shaft, screw, or other elongate component passing through case 28 and body 20 and having an adjustment capable of being operatively retained by threads, clamp, friction, setscrew, lock, detent, or any other suitable means. A second end of the first elongate component, pin 68, passes through tube 96, and continues through body 20, to bear on the center of a first end of a second elongate component, the adjustment screw 76, inside a head 54 of body 20. Screw 76 is two to twenty turns from the limit of its travel in body 20, or ten turns from the limit providing 8 mm (0.314 inch) range of adjustment to pin 68 stop 88. Screw 76 extends beyond a second end of the body, the head 54 of body 20.

Spindle 66 is a diameter smaller than the inside diameter of a resized cartridge case neck 60. The inside diameter of a resized neck 60 depends on the diameter of the expander used in resizing case 28 and the elasticity of the brass. The clearance for spindle 66 may be 0.013 to 0.076 mm (0.0005 to 0.003 inch), or 0.025 to 0.05 mm (0.001 to 0.002 inch), smaller outside diameter than neck 60 inside diameter, or a clearance sufficient to align the tool with neck 60 yet allow the case to turn freely about spindle 66. Above spindle 66 is a third section of body 20, a head 54, which may be cylindrical, hexagonal, or other shape, generally larger than spindle 66, of a sufficient size for supporting a blade 18 mounted or fastened therein or thereon, and for facilitating manipulation. Ball 52, spindle 66, and head 54 sections may be a single part or separate parts or pieces fitting or fastening together by suitable means, of the same or different suitable materials. For example, a polymer ball 52 section could snap into a machined metal spindle 66 or sleeve 78 that screws into a cast metal head 54 section. In the present embodiments the ball 52, spindle 66, and head 54 sections are cast or molded as one piece, of a polymer.

The internal components, FIG. 1 section 1-1, comprise a first elongate component pin 68, a second elongate component screw 76, and a tube 96. The first elongate component, pin 68, is preferably not fastened, or may be fastened to, second elongate component screw 76, or may be held by a magnet the diameter of screw 76 or smaller, placed between pin 68 and screw 96. Pin 68 diameter is less than case 28 flash hole 48 diameter, or may be larger and have one end reduced to a diameter less than flash hole 48 diameter for a length sufficient to pass to the end of case 28. A suitable material for pin 68 is spring steel music wire 1.575 mm (0.062 inch) diameter because it has a hardness in the range of Rockwell C40 to C60 to resist wear in this application, can flex in use but not become bent when used in cases that are not concentric, fits through small flash holes, and withstands repeated use. Other forms of elongate components or other materials with suitable properties may be used.

Adjustment screw 76 may be a section of machine screw size 8-32, threaded rod, or a headless set screw, from 10 to 50 mm long, or 25 mm (1 inch) long, or other suitable length, of steel or other suitable material. In an alternate embodiment, screw 76 may be a diameter up to neck caliber, of sufficient length for a given cartridge, to pass through body 20 with a section of pin 68 attached to first end of screw 76, and may omit tube 96. Screw size 8-32 is a fine enough thread to provide small increments of adjustment, and as screw 76 also serves to fasten the tool, 8-32 is a standard size for the reloading industry. The tool can be fastened to a handle for use as a hand held tool, or fastened in applicant's Rotor Device, or other case preparation machines. Size 8-32 is a diameter to allow sufficient material in body 20 surrounding screw 76 for structural strength. Screw 76 extends on the center axis of head 54 of body 20 for a length sufficient to: turn screw 76 with one's fingers during adjustment; include lock nut 64 as a frictional means to releasably secure the adjustment, or other suitable means; and to fasten the tool into a machine or a handle.

Tool body 20, FIG. 1 section 1-1, has a central internal cavity 32 which has cast, inserted, cut, or molded 8-32 internal threads 94, in head 54 to accept screw 76, and of a length sufficient to hold the tool securely by screw 76 while providing a range of adjustment. Other suitable threads or means of adjusting the distance from blade or blades 18 to stop 88 may be used, such as a rod held by a clamp or latch. Cavity 32 through the length of ball 52 and into spindle 66 is of a diameter to accept tube 96, which may be held by threads or other holding means, or held by a diameter of cavity 32 in ball 52 and into spindle 66 sufficient to hold the exterior of tube 96 by removable friction fit. Cavity 32 partially through spindle 66 and into head 54 has an internal diameter substantially the same as the internal diameter of tube 96, to support pin 68 while allowing pin 68 to slide adjustably.

Cavity 32 may be formed by casting or injecting material around a pin 68, screw 76, and tube 96 assembly coated with a release agent and centrally positioned in a mold. Pin 68 may be fastened into screw 96 by drilling a hole on the center axis of one end of screw 96 to a depth and of a diameter sufficient to hold pin 68 by welding, staking, brazing, soldering, epoxy adhesive, interference fit, or other suitable means. The mold may be filled by pouring or injecting a polymer into the mold, and removing the tube 96, pin 68, and screw 76 after body 20 material has hardened sufficiently, or by other suitable means. A removable pin 68, screw 76, and tube 96 can also support and position an armature 14 bearing blades 18 during molding or casting. Armature 14 bearing blades 18 is thereby permanently embedded in body 20. A machined or molded body 20 may have cavity 32 formed by drilling, with threads 94 cut, or a threaded insert.

Tube 96 fits around and supports pin 68 first elongate component to prevent it from deflecting during use, while ball 52 and cavity 32 hold and support tube 96. Tube 96 has an inside diameter slightly greater than pin 68 first elongate component of 1.575 mm (0.062 inch) outside diameter music wire. For example, a 2.38 mm (0.0938 inch) outside diameter tube of steel, brass, or other metal or composite material having a wall thickness of 0.343 mm (0.014 inch) is a suitable tube. Other first elongate component sizes or materials, or any suitable tube size or material, or a telescoping set of tubes with a smaller tube or tubes fit slidably into a larger tube or tubes, may be used, up to a tube of caliber diameter whereby the spindle may be omitted and the tube fastened directly into head 54 by threads, friction fit, or other suitable means.

Screw 76, pin 68, body 20, sleeve 78, and tube 96 may be treated with heat cured polymer ceramic, powder coat, nitride, anodize, paint, ink, or other suitable coating to protect them, identify lengths by colors, and provide a hard, slick surface. Screw 76, pin 68, and tube 96 may also be coated to lubricate and protect them from corrosion, with a sizing die wax lubricant or other lubricant that will not degrade primers or powders. Wax allows pin 68 to adhere in tube 96, while allowing adjustment via screw 76, and interchangeability in body 20 of tubes and pins of different lengths.

The same pin 68 and tube 96 diameter are used for all calibers. Tube 96 may be made in various lengths to pair with pin 68 of suitable lengths for different lengths of cartridges. The pins and tubes are interchangeable to allow a single tool body to be used for every cartridge in that caliber. For example: a tool for 7.82 mm (0.308 inch, nominally .30 caliber) works for every .30 caliber cartridge from 300 H&H Magnum, with case minimum overall length of 72.39 mm (2.850 inch); to 300 AAC Blackout, with case minimum overall length of 34.75 mm (1.368 inch). By using a longer pin 68 and tube 96 for the longer case, and a shorter pin 68 and tube 96 for the shorter case, the same .30 caliber tool works in either cartridge. With the appropriate lengths of pin 68 and tube 96, a tool with a .30 caliber sized spindle 66 works in all lengths of .30 caliber cartridge cases.

Manufacturers make bullets for reloading in about thirty rifle calibers, and half or fewer of those are the most popular. The adjustable case preparation tool body is easy to make or modify to fit the less popular, obscure, or custom wildcat calibers as well. Five lengths of pin 68 in 10 mm (0.394 inch) increments would fit over one hundred different rifle cartridges from 32 (1.260 inch) to 76 mm (2.992 inch) overall length, given an 8 mm (0.315 inch) range of adjustment of screw 76. Fewer length increments of tube 96 are needed because; many cartridges have similar lengths, tube 96 only needs to be long enough to support pin 68 partially beyond ball 52, and tube 96 need not be fully inserted into body 20. In addition, pin 68 and tube 96 may be made from inexpensive and readily available hobby supplies, which would allow the user to cut any lengths of tubes and pins desired, and dress the ends, using an abrasive cutoff disc on a high speed rotary tool.

Case Trimmer Embodiment

In a case trimmer embodiment, FIG. 1 and section 1-1, one or more blades 18, of tungsten carbide or other suitable material, are fastened into spindle 66, or into head 54 above spindle 66. Blades 18 are at right angles to spindle 66 and may extend into it partially, and blades 18 are substantially imbedded in head 54, with cutting edge 10 disposed to remove thin chips or shavings of brass, the swarf, from mouth 58 of case 28 squarely. Blades 18 may be molded into body 20, or fastened by sonic welding, epoxy, solder, braze, or other suitable means into body 20, or fastened onto an armature 14 by welding, epoxy, solder, braze, or other suitable means and molded or cast into body 20, depending on the material and method used for making body 20. The cutting edge 10 of each blade 18 may be ground using a diamond abrasive, before or after forming them into body 20, or both. The fastening of blades 18 in a polymer body 20 is sufficiently strong to hold a blade 18 for removing swarf because case necks are relatively thin, from 0.25 to 0.6 mm (0.010 to 0.024 inch) thickness, and necks of cases are annealed, so the brass is soft. Blade or blades 18 in the trimmer FIGS. 1 and 1-1, and in other embodiments FIGS. 2, 3, 4, and 5, are each at least of a size wide enough to cut swarf from case 28 neck 60, thick enough to support cutting edge 10, and long enough to fasten onto or into tool body 20 on an armature or plate or by other suitable means, or may be larger. Tungsten carbide is extremely hard and well suited to cutting brass swarf without dulling. However, if it were ever desired, the adjustability of the tool allows blade or blades 18 to be re-sharpened without any loss of utility.

Head 54 section of body 20, FIG. 1 and section 1-1, may be larger than spindle 66 section. The end of head 54 opposite blade 18 and spindle 66 has a flat surface 90 at a right angle to the long axis of the tool, and an 8-32 lock nut 64 bears against flat surface 90 as a frictional means to releasably secure screw 76 adjustments. Any other suitable means for locking, clamping, or fastening the adjusted length of stop 88 may be used. After adjustment, a variable length of from 5 mm to 25 mm, or 10 mm (0.4 inch) of screw 76 extends beyond lock nut 64 to fasten the tool into a machine or handle. If the adjusted tool screw 76 length extending beyond body 20 is too long to allow a handle or machine to accept all of the exposed threads, such as in a handle or machine with a shallow blind hole, an additional 8-32 nut 64 or nuts may be screwed on as a spacer to reduce the length of exposed threads for fastening the tool, or a shorter screw 76 may be used.

To use the case trimmer embodiment, it is removed from the machine or handle, if installed in one, lock nut 64 is loosened, and a case of the desired length, held in case holder 30, is placed onto the tool with case mouth 58 touching blades 18. Screw 76 is turned into head 54 until pin 68 through flash hole 48 touches the solid face 40 of case holder 30, and lock nut 64 is tightened to set the length. If blades 18 do not touch case mouth 58 with pin 68 stop 88 against case holder face 40, screw 76 is turned out of head 54 until they do, and lock nut 64 is tightened. Alternatively, the tool can be adjusted to a desired length using a caliper to set a measured length from stop 88 to edge 10, and tighten lock nut 64 to lock the adjustment. The adjusted trimmer is screwed back into the machine or handle, and a case 28 turning clockwise in a case holder 30 is slid onto ball 52 and over spindle 66 to contact blades 18 and trimmed until stop 88 touches face 40 of case holder 30 and cutting stops.

To convert the tool to a longer cartridge in the same caliber, the shorter tube 96 and pin 68 are pulled from ball 52, and a tube 96 and pin 68 of appropriate length are selected and the longer tube 96 is pushed into the tool, and the longer pin 68 is slid into tube 96 until it contacts screw 76 inside head 54, and the above adjustment procedure is performed. In each tool embodiment, the cutting action of blade 18 stops when pin 68 stop 88 abuts face 40 of case holder 30. The direction and torque of cutting secure the adjustment against lock nut 64.

Chamfering and Deburring Tool Embodiments

After a case 28 is trimmed to length, the freshly cut case mouth 58 will be chamfered and deburred. In the case mouth chamfering, FIG. 2, and deburring FIG. 3, tool embodiments the blade or blades 18, of tungsten carbide or other suitable material, are fastened into head 54, or partially into spindle 66, at angles to spindle 66. A separate tool may be made for chamfering the inside of case mouth 58, and a separate tool for deburring the outside of case mouth 58. Combining chamfering and deburring in a single tool would negate an aspect of adjustability, that of setting a desired depth for each cut independently of the other. The two separate tools, or a combined single tool, have a blade or blades 18, or three, at an angle, from 4 to 30 degrees, or 20 degrees, or any angle sufficient to chamfer, FIG. 2, the inside of a case mouth, and another blade or blades 18, or three, at an angle of 10 to 80 degrees, or 45 degrees, or any angle sufficient to deburr, FIG. 3, the outside of a case mouth. Blades 18 may be molded into body 20 and spindle 66 or fastened by sonic welding, epoxy, solder, braze, or other suitable means into body 20, or fastened onto an armature 14 by welding, epoxy, solder, braze, or other suitable means and molded or cast into body 20 and spindle 66, depending on the material and method used to make body 20. Because blades 18 are set at angles, a tool of spindle 66 diameter may be used in spindle caliber cases and some larger cases. The chamfering and deburring embodiments need not be strictly caliber specific, and may work acceptably for calibers of similar size, given the range of adjustment provided by interchangeable pin 68, tube 96, and adjustment screw 76.

Figure 2:
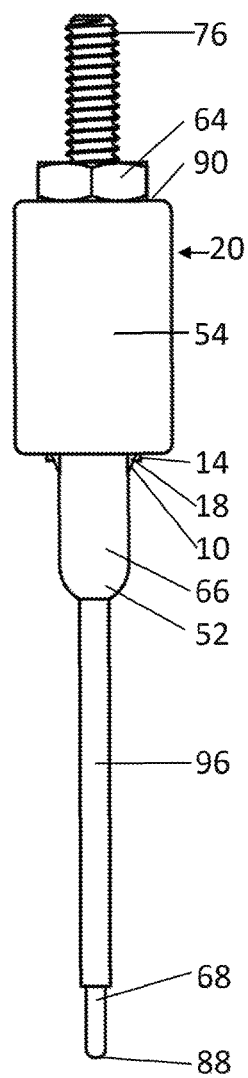
FIG. 2 is a side view of a case mouth chamfering embodiment.
Figure 3:
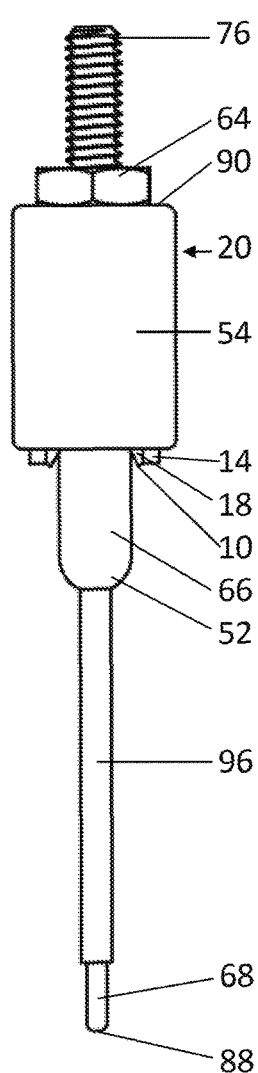
FIG. 3 is a side view of a case mouth deburring embodiment.

The case mouth chamfering FIG. 2, and deburring FIG. 3, tool embodiments are adjusted and used in the same manner, by installing pin 68 and tube 96 of appropriate lengths for a case, and adjusting screw 76 until stop 88 touches the case holder face when blades 18 have reached a desired depth. Each one-quarter turn of screw 76 provides 0.198 mm (0.098 inch) increment of adjustment to blade 18. Blades 18 remove swarf to chamfer or deburr a case mouth by turning the case held in a case holder against blades 18 until pin 68 stop 88 abuts face 40 of the case holder and cutting stops. A preferred adjustment setting for each embodiment removes as little material as necessary to smoothly chamfer and deburr the circumference of a case mouth. With each tool so adjusted, every resulting case mouth presents a flat ring of uniform width between the deeper inside bevel of the chamfering and the shallower outside bevel of the deburring. This is possible when the chamfering and deburring embodiments are used after, thereby interacting and cooperating with, the trimming embodiment, due to the adjustability of each embodiment.

Flash Hole Deburring Tool Embodiment

Figure 4:
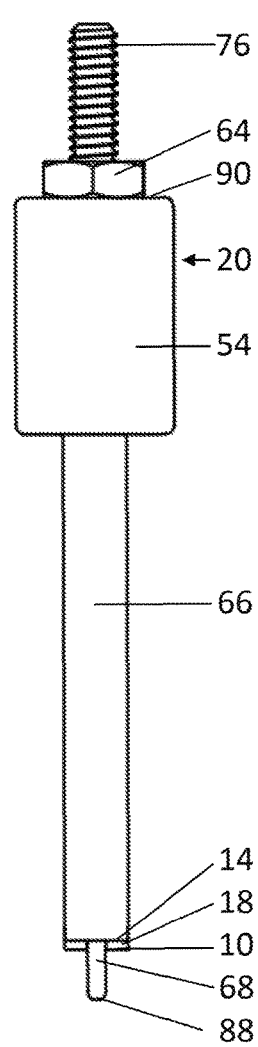
FIG. 4 is a side view of a flash hole deburring embodiment.

The case web uniforming and flash hole deburring tool embodiment, FIG. 4, of the adjustable case preparation tool differs from the previously described embodiments in that the end of body 20 is cylindrical and slightly less than case neck inside diameter. In other words, it is all spindle 66 below head 54, with no ball or exposed tube. Spindle 66 is the diameter specific to a caliber, with pin 68 protruding beyond blades 18. One or more, or three, blades 18, of tungsten carbide or other suitable material, are molded or fastened into the end of spindle 66 by suitable means, with cutting edge 10 exposed at right angles to pin 68. The outer sides of blades 18 are rounded smooth to prevent scratching the inside of neck 60 during insertion and removal of the tool. The inner sides of blades 18 may contact pin 68 without an intervening tube 96. Tube 96 may be absent from this embodiment, or molded into spindle 66 above blades 18, or inserted into body 20 from the head end, to reinforce spindle 66. A tube 96 molded into spindle 66 may serve as an armature 14, or a fastening point for mounting blades 18 by braze, solder, epoxy, or other suitable means.

This embodiment of the tool is adjusted in the same manner as described for each previous embodiment, by using screw 76 to lengthen or shorten the protrusion of pin 68 stop 88. The flash hole tool is adjusted to cut a shallow, flat, circular area substantially the diameter of spindle 66 around a flash hole. This cleans powder residue from web 98 and removes any burr or punched piece that remained inside the case, while leaving the flash hole a cylindrical aperture with no chamfer. Pin 68 will not enlarge a flash hole. The web uniforming and flash hole deburring embodiment is long enough for use in the longest case in each caliber, and interchangeable tubes and pins are not needed. Pin 68 is small enough to work in small or larger flash holes. A flash hole deburring tool for a smaller caliber will work in a larger caliber case if spindle 66 is long enough to reach the web of the larger case, but a tool for the specific caliber will clean a larger diameter of web 98 and be better aligned.

Neck Turning Tool Embodiment

Figure 5:
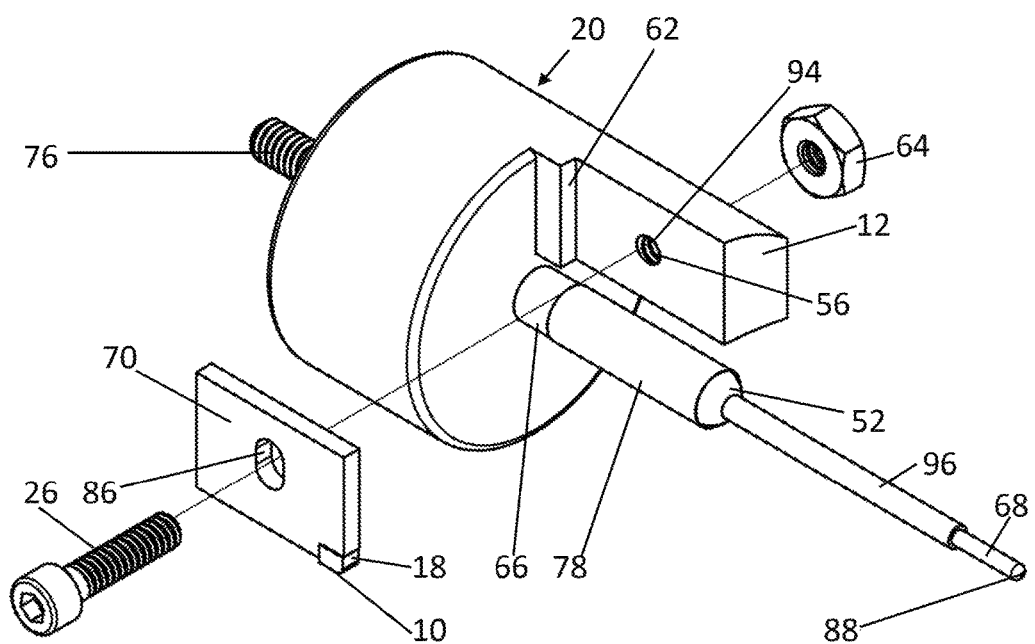
FIG. 5 is a partially exploded perspective view of a case neck turning embodiment.

A case neck turning tool embodiment, FIG. 5, has in addition to ball 52, spindle 66, and head 54 sections of body 20 of the previously described embodiments, an arm 12 projecting from one side of head 54 parallel to spindle 66 to a length sufficient to work the longest case neck 60 of cartridges in the caliber of spindle 66. A smaller spindle or a larger tube may be used in conjunction with a sleeve 78 of metal or other suitable material fitted over the spindle or tube. Sleeves 78 can be made in 0.025 mm (0.001 inch), or other increments, of case neck diameter, with interchangeable sets of sleeves 78 used to allow the user to select a desirable fit for their particular cases. A rectangular plate 70, of steel 1 to 5 mm (0.039 to 0.197 inch), or 2 mm (0.079 inch) thick, or other suitable material or thickness, having an aperture or slot 86, is a means for positioning blade 18. Plate 70 is movably fastened to arm 12 by means of a bolt 26 passing through slot 86 in plate 70 and threading into a hole 56 through arm 12. Hole 56 in arm 12 has threads 94 molded, cut, cast, or a threaded insert in arm 12, or other suitable means. Arm 12 may be a separate part fastened to head 54 section of body 20 by screws or other suitable means, or molded as part of body 20 as in the present embodiment. Blade 18 may be a hardened, sharpened protrusion of plate 70, or a blade 18 of tungsten carbide or other suitable material may be fastened into a receiving cut on an edge of a long side at one end of plate 70 at a corner by braze, epoxy, solder, or other suitable means. Plates 70 may be made with blades 18 having angles and radii matching the angle and radius of the junction of the neck with the shoulder of various cartridge cases, and marked to identify them accordingly.

The short side of plate 70 opposite blade 18 is cut or ground at a right angle to cutting edge 10 of blade 18, and rests against a corresponding vertical locating notch 62 cut into or molded onto arm 12. Notch 62 is at a right angle to the surface of spindle 66. Arm 12 provides a flat bed surface for plate 70 and notch 62 holds cutting edge 10 of blade 18 parallel to spindle 66, allowing slidable adjustment of blade 18 into or away from spindle 66. Sliding plate 70 may alternatively or additionally be positioned movably on arm 12 by dado, dovetail, or other suitable means of holding blade 18 edge 10 parallel to spindle 66. Threaded hole 56 in arm 12 accepts bolt 26, or a hex drive cap screw, of a size from 6-32 to ¼-28, or 8-32, or other suitable fastener or fasteners, which passes through slot 86 in plate 70 to engage threads 94 in arm 12. Bolt 26 may be provided with a lock washer under the head, and bolt 26 may be long enough to pass through arm 12 to allow a lock nut 64 to bear on the underside of arm 12.

To use the neck turning embodiment, first select a sleeve 78 of a caliber to turn freely in the case neck, and slide the sleeve onto spindle 66. Next adjust the tool to set the distance from blade 18 to sleeve 78, which is the desired neck thickness or depth of cut. To adjust the depth of cut, bolt 26 is loosened and blade 18 is pressed against the thinnest side of a representative case neck 60 placed onto sleeve 78, by sliding plate 70 against the neck. Alternatively, blade 18 is pressed against a feeler gauge of the desired neck thickness held between sleeve 78 and blade 18. With plate 70 held against notch 62 and blade 18 against case neck 60 or a feeler gauge, bolt 26 is tightened securely, and case 28 is pulled straight off sleeve 78, or the feeler gauge is removed by pulling it away from the direction of cut. The length of cut is adjusted as in the other embodiments by loosening lock nut 64 and backing screw 76 out of head 54 to lengthen, or into head 54 to shorten, the length of cut, and tightening lock nut 64. All cases in a batch should be turned with the same adjusted depth and length.

To use the adjusted tool, a case is turned in a case holder by hand or machine and the case mouth is guided onto ball 52 and as the neck travels onto sleeve 78, blade 18 shaves excess thickness from the neck until pin 68 stop 88 contacts the face of the case holder. Because cutting length is stopped by stop 88 of pin 68, the neck turning embodiment does not touch case mouth 58, so it cannot mar the surface of mouth 58 of case 28. The range of neck thickness cutting adjustment provided by slot 86 in plate 70 needs only to be 0.25 to 0.75 mm, or about 0.5 mm (0.02 inch), because typical cartridge case neck 60 thicknesses range from 0.25 to 0.6 mm (0.010 to 0.024 inch) thick. The variation in thickness of necks in a given batch of cases is substantially less, and the objective is to remove only the thickest portions.

Opinions vary, depending on the reloading procedures followed, whether or not it is prudent to extend the neck turning cut beyond the case neck onto the shoulder. This would be done to prevent an interior thickening, or donut, from forming after repeated firing and resizing, inside the case at the junction of the case neck with the shoulder. Blade 18 tip is shaped to match the angle and radius of the junction to perform a cut onto the shoulder if so desired. Plates 70 with blades 18 having the correct angle and radius for different cartridge neck to shoulder junctions are interchangeable on arm 12, and all plates 70 are interchangeable on bodies 20 with spindles 66 fitted with sleeves 78 of different calibers.

Method of Using the Adjustable Case Preparation Tool

Figure 6:
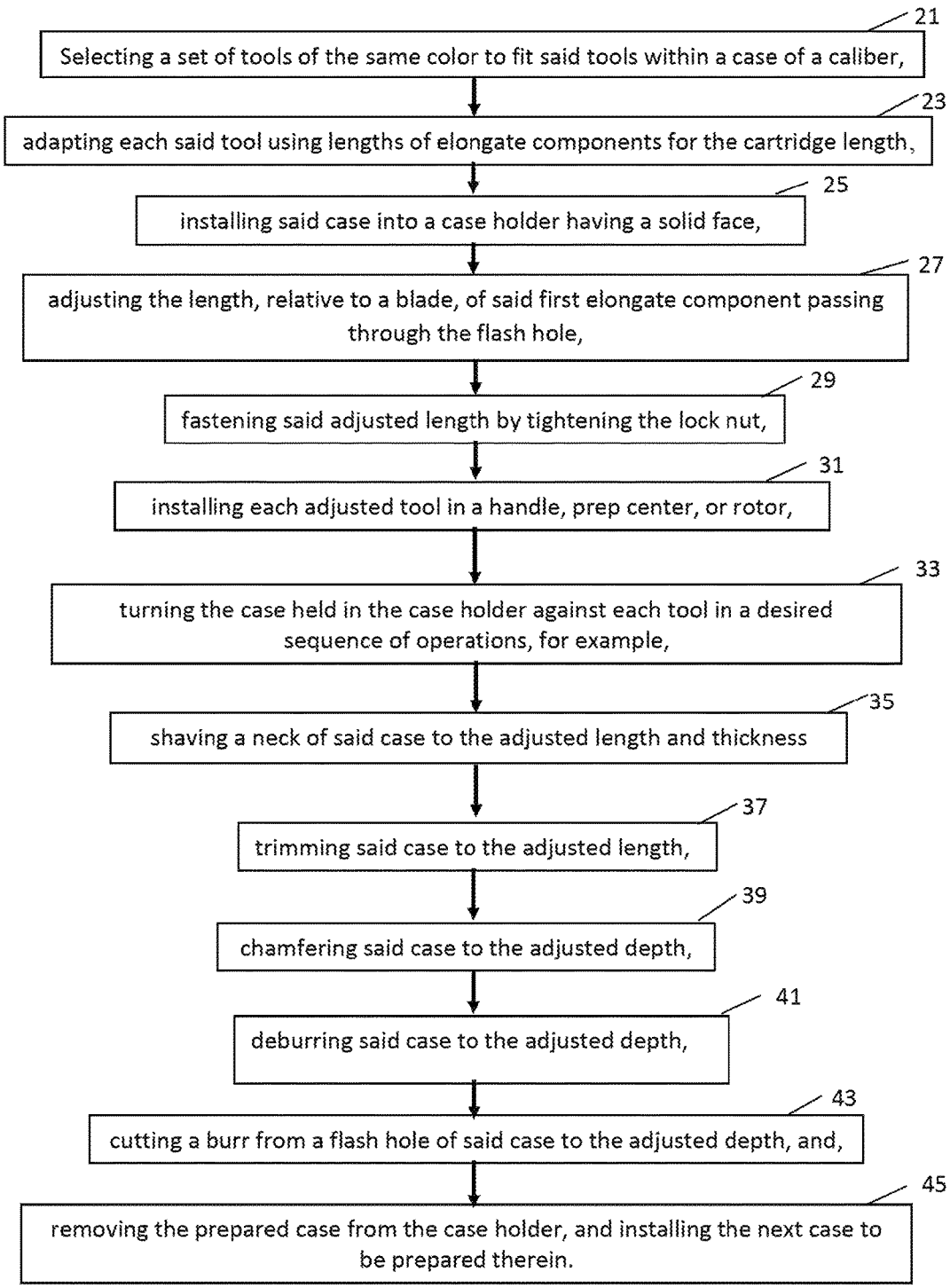
FIG. 6 is a method of using embodiments of the adjustable case preparation tool to prepare a case for reloading.

An embodiment of a method, FIG. 6, to use the adjustable case preparation tool to recondition new or used cartridge cases for handloading or reloading comprises the following steps: selecting a set of tools of the same color to fit the tools within a case of a caliber 21; adapting each tool using lengths of elongate pin and tube components for the cartridge length 23; installing the case into a case holder having a solid face 25; adjusting the length, relative to a blade, of the first elongate component passing through the flash hole 27; fastening the adjusted length by tightening the lock nut 29; installing each adjusted tool in a handle, prep center, or rotor 31, turning the case held in the case holder against each tool in a desired sequence of operations, for example 33, shaving a neck of the case to the adjusted length and thickness 35, trimming the case to the adjusted length 37, chamfering the case to the adjusted depth 39, deburring the case to the adjusted depth 41, cutting a burr from a flash hole of the case to the adjusted depth 43, and removing the prepared case from the case holder and installing the next case to be prepared therein 45. Flash hole deburring is only necessary once, typically the first time a case is reloaded, and may be done before or after other steps. Chamfering and deburring are necessarily done after trimming. Turning the neck may be done before or after trimming, and may be done more than once.

Those with skill in the art, who, having been taught by the detailed description and drawing how to make and use an adjustable cartridge case preparation tool, including examples of various embodiments and their features, implications, and capabilities, must also realize that modifications, variations, and equivalents to the form, construction, arrangement, and combination of parts, materials, methods, and other aspects are possible, based on the principle of an adjustable cartridge case preparation tool; thus, all remain within the scope of the claims. Further features of the adjustable case preparation tool are to be found in the following claims.

I claim:

1. An adjustable case preparation tool for reconditioning a cartridge case for reloading comprising:
   a body having a first end and a second end, said first end of a caliber to fit inside the neck of said case,
   said body having at least one blade having an edge for cutting swarf from said case,
   a cavity on a central axis of said body, a first elongate component within said cavity of said body, said first elongate component having a first end of a diameter less than a flash hole diameter of said case, said first elongate component length adjustable to extend through said flash hole, a lock for releasably fastening the length of said first elongate component, and said first end of said first elongate component is a stop for cutting by said edge, wherein said tool is adjustable via the first elongate component and lock.

2. The tool of claim 1, wherein said tool is selected from the group consisting of cartridge case cleaning, cutting, chamfering, deburring, reaming, shaving, trimming, and uniforming case preparation tools.

3. The tool of claim 2 comprising:

said at least one blade proximate said first end of said body, and said at least one blade substantially at a right angle to said first elongate component, whereby a flash hole burr may be removed inside a cartridge case to an adjustable depth.

4. The tool of claim 1 comprising:

a plurality of first elongate components having a plurality of different lengths, respectively, a plurality of body first end calibers, respectively, and said plurality of said first elongate components interchangeable in said plurality of said bodies, whereby the tool can be used for different lengths and case neck diameters of cartridges.

5. The tool of claim 1 comprising:

a second elongate component within a second end of said cavity of said body of said tool, said second elongate component having a first end in contact with a second end of said first elongate component, said second elongate component having a second end extending beyond said second end of said body, said second end of said second elongate component having threads for fastening said tool, and said second elongate component adjusts said stop, wherein a length of the tool can be adjusted and subsequently fastened to a handle or machine.

6. The tool of claim 4 comprising;

a tube at said first end of said body in said cavity, said tube supports said first elongate component, a plurality of alternate tubes having different lengths that are interchangeable in said cavity of said body, and said plurality of said first elongate components are interchangeable in said tube, wherein the tool can fit various cartridge lengths of a caliber.

7. The tool of claim 6 comprising;

said at least one blade proximate said body said second end, and said at least one blade having a cutting edge substantially at a right angle to said body, whereby cases may be trimmed to an adjusted length.

8. The tool of claim 6 comprising;

said at least one blade proximate said body said second end, and said at least one blade having a cutting edge at an angle to chamfer the inside of said case neck, whereby case mouths may be chamfered to an adjusted depth.

9. The tool of claim 6 comprising;

said at least one blade proximate said body said second end, and said at least one blade having a cutting edge at an angle to deburr the outside of said case neck, whereby case mouths may be deburred to an adjusted depth.

10. The tool of claim 6 comprising;

said at least one blade affixed to an edge, proximate an end, of a plate, an arm holding said plate said edge parallel to said first end of said body, said blade having a cutting edge parallel to said axis of said body and proximate said body said first end, a means on said arm for positioning said cutting edge a set distance from said body, and a frictional means for releasably fastening said plate at the set distance from said body, whereby variations in thickness of the neck of a case may be removed.

11. The tool of claim 1, further comprising: a plurality of bodies, each body of said plurality of bodies having a first end of a different caliber relative to each other body, wherein each body has a different color relative to each other body which allows for visual identification of the caliber of any said body.

* * * * *